US007461259B2

United States Patent
Lakshmi Narayanan (10) Patent No.: US 7,461,259 B2
(45) Date of Patent: Dec. 2, 2008

(54) METHOD AND APPARATUS TO PROVIDE SECURE MOBILE FILE SYSTEM

(75) Inventor: Ram Gopal Lakshmi Narayanan, Hudson, NH (US)

(73) Assignee: Nokia Corporation, Espoo (FI)

( * ) Notice: Subject to any disclaimer, the term of this patent is extended or adjusted under 35 U.S.C. 154(b) by 918 days.

(21) Appl. No.: 10/880,658

(22) Filed: Jun. 30, 2004

(65) Prior Publication Data

US 2006/0015731 A1    Jan. 19, 2006

(51) Int. Cl.
  *H04L 9/00* (2006.01)
(52) U.S. Cl. .......................... 713/176; 709/9
(58) Field of Classification Search .................. 713/176
  See application file for complete search history.

(56) References Cited

U.S. PATENT DOCUMENTS

| | | | | |
|---|---|---|---|---|
| 4,644,493 | A * | 2/1987 | Chandra et al. ............... | 705/56 |
| 4,827,508 | A * | 5/1989 | Shear ............................ | 705/53 |
| 5,671,279 | A * | 9/1997 | Elgamal ........................ | 705/79 |
| 5,878,134 | A * | 3/1999 | Handelman et al. .......... | 340/5.6 |
| 6,409,089 | B1 * | 6/2002 | Eskicioglu ................... | 235/492 |
| 6,516,316 | B1 * | 2/2003 | Ramasubramani et al. ..... | 707/9 |
| 2002/0065074 | A1 * | 5/2002 | Cohn et al. ................... | 455/422 |
| 2006/0126833 | A1 * | 6/2006 | O'Leary et al. ............... | 380/30 |
| 2007/0194117 | A1 * | 8/2007 | Takashima et al. ........... | 235/454 |

OTHER PUBLICATIONS

"A Cryptographic File Systems for Unix", Matt Blaze, 1993, 8 pages.

* cited by examiner

*Primary Examiner*—Kambiz Zand
*Assistant Examiner*—Dant B Shaifer Harriman
(74) *Attorney, Agent, or Firm*—Harrington & Smith, PC (57) ABSTRACT

In an exemplary embodiment of this invention there is disclosed a mobile wireless terminal (50) that includes a transceiver (52) for coupling the mobile wireless terminal to a wireless network operator (60), a controller (54) and a memory (56). The memory may be assumed to store a file system program (56A) executable by the controller, and to be operable to store a file having a file data portion (14) for containing file data and a data structure, such as a file header (10), having fields for containing values. A plurality of the fields contain a value of a public cryptographic key (24) associated with a file creator, a seed value (26), an encrypted seed value (28) obtained by encrypting the seed value with a private cryptographic key of the file creator, and a file integrity value (30) obtained using the encrypted seed value and the file data. By the use of the preferred embodiments a file can be traced-back though a plurality of file handlers to a creator of the file.

36 Claims, 5 Drawing Sheets

METHOD AND APPARATUS TO PROVIDE SECURE MOBILE FILE SYSTEM

TECHNICAL FIELD

This invention relates generally to file system security and, more specifically, relates to techniques to provide file system security in a mobile environment, such as in a wireless communications environment.

BACKGROUND

Malicious programs such as those known as viruses and worms can be attached to a file and spread through the Internet. One recent trend is that a virus is spread through an email system as an attachment, and when the user executes the attachment (by performing a double click operation), the virus is activated and then performs abnormal operations or/and side-effects to the user data/program that may result in unrecoverable data loss.

There are several known techniques to share files among users. For example, email or web downloads, Peer-2-Peer (P2P) and File Transfer Protocol (FTP) are well known mechanisms to exchange files among business users and consumers. In general, when the user downloads files, the user expects that the program is trusted and well behaved. However, the inventor is not aware of any mechanism that currently exists to enable one to track the source of a file. An attacker may exploit this behavior and create a malicious program such as a virus. As the user has no knowledge of the actual source of the file that contains the virus, after the virus program is downloaded it is executed on the user's machine, and may create undesirable side effects resulting in financial loss for the user.

The problem that arises because of the lack of source verification is not restricted to file sharing. The Internet uses the Internet Protocol (IP) that also suffers from the same problems, and the anonymous nature of the IP protocol may be exploited by an attacker to generate denial of service (DoS) attacks. Any node can masquerade and generate an IP packet to another node.

Email applications typically use the Simple Mail Transfer Protocol (SMTP). SMTP inherits the properties of IP and suffers from the same problems, that is, anyone can send email spam to a valid address by inserting a non-existent or some other email address as the source of the email.

Source validation and source tracking are fundamental problems that persist today in the Internet, and also in file system space. As attacks grow more sophisticated, these fundamental problems need to be resolved.

For example, as mobile terminals, such as cellular telephones, become multi-functional and support functions such as PDA, voice service, email, P2P and gaming, it can be expected that attacks on mobile terminals can be launched in a similar manner as attacks on traditional fixed network components and nodes. The impact on mobile terminals may be, however, more severe, because the mobile terminal typically runs in a constrained environment with limited computing and other resource power. When a virus or other malicious program is activated it may attempt to consume additional resources, and can cause a drain on battery power. Further, since many mobile terminals are not true multitasking devices, and don't have a clear separation of kernel and user space, a virus might exploit this architecture to cause the operating program to malfunction.

The problem is to restrict the spread of virus. In general, if a program misbehaves by creating an undesirable or an unexpected side effect the user should be able to track the source of the program. For example, assume that a mobile terminal user (say A) downloads a program from another mobile terminal user (say B), or from an operator host web server (say C). If the mobile terminal user B's system, or the operator host web server, is compromised by a virus, then after downloading the malicious program the terminal of user A can be compromised. It would desirable in this case to determine the actual source of the file.

The existing anti-virus software and other mechanisms for dealing with malicious programs are not adequate for solving the problem of determining the actual source of a program, such as a malicious program.

SUMMARY OF THE PREFERRED EMBODIMENTS

The foregoing and other problems are overcome, and other advantages are realized, in accordance with the presently preferred embodiments of these teachings.

In one aspect this invention provides a method to process a file. The method includes, in response to a file creator creating the file, obtaining a seed value; encrypting the seed value using a private cryptographic key associated with the file creator to form an encrypted seed value; storing as part of the file a public cryptographic key associated with the file creator, the seed value and the encrypted seed value; computing a file integrity value using the encrypted seed value and file data and storing as part of the file the computed file integrity value. A digital signature procedure may be used as well for this purpose.

The method can further include storing as part of the file the public cryptographic key associated with the file creator as a value of a current user public key and as a value of a previous user public key; encrypting the values of the current user public key, the previous user public key, file integrity value using the private cryptographic key associated with the file creator to form an encrypted result and storing as part of the file the encrypted result as an encrypted key validation value.

If the file creator is considered as User-1, the method may further include, in response to another user (User-2) gaining access to the file, extracting from the file the stored values of the previous user public key, the current user public key and the encrypted result; in response to User-2 becomes a current user of the file, copying the value from the current user public key to the value of the previous user public key; overwriting the value of the public cryptographic key associated with User-2 as the value of the current user public key; encrypting the values of the current user public key and the previous user public key using a private cryptographic key associated with User-2 to form a second encrypted result and storing as part of the file the second encrypted result as the encrypted key validation value.

During an optional trace back process the method may include decrypting the second encrypted result using the value of the public cryptographic key of User-2 to yield the value of the public cryptographic key of User-1 and associating User-1 with the file creator.

In a further aspect of this invention there is disclosed a system to process a file. The system includes a file creator to create the file, the file creator comprising a unit to obtain a seed value and encrypt the seed value using a private cryptographic key associated with the file creator to form an encrypted seed value. The file creator unit further operates to store as part of the file a public cryptographic key associated with the file creator, the seed value and the encrypted seed value, to compute a file integrity value using the encrypted seed value and file data and to store as part of the file the computed file integrity value. A digital signature procedure may be used as well for this purpose.

In a further aspect of this invention there is disclosed a file having a representation that is storable in a digital data storage medium. The file includes a file data portion for storing file data and a data structure containing fields for storing values. At least one of the fields can store a name of the file, and a plurality of others of the fields store a value of a public cryptographic key associated with the file creator, a seed value, an encrypted seed value obtained by encrypting the seed value with a private cryptographic key of the file creator and a file integrity value obtained using the encrypted seed value and the file data.

In a still further aspect of this invention there is disclosed a digital data storage medium that stores a file having a file data portion for containing file data and a data structure that includes fields for containing values. A plurality of the fields contain a value of a public cryptographic key associated with the file creator, a seed value, an encrypted seed value obtained by encrypting the seed value with a private cryptographic key of the file creator and a file integrity value obtained using the encrypted seed value and the file data. In a presently preferred, but non-limiting embodiment, the plurality of fields further contain a current user public key value, a previous user public key value, and an encrypted result value obtained by encrypting the current user public key value and the previous user public key value using the private cryptographic key associated with the current user. Depending on the specific implementation, the plurality of fields may further optionally contain a file state value that indicates, for example, at least whether the file is in an open state, a read state, or a write state.

In a still further aspect of this invention there is disclosed a mobile wireless terminal that includes a transceiver for coupling the mobile wireless terminal to a wireless network operator, a controller and a memory. The memory may be assumed to store a file system program executable by the controller, and to be operable to store a file comprised of a file data portion for containing file data and a data structure comprising fields for containing values. A plurality of the fields contain a value of a public cryptographic key associated with the file creator, a seed value, an encrypted seed value obtained by encrypting the seed value with a private cryptographic key of the file creator, and a file integrity value obtained using the encrypted seed value and the file data.

BRIEF DESCRIPTION OF THE DRAWINGS

The foregoing and other aspects of the preferred embodiments of this invention are made more evident in the following Detailed Description of the Preferred Embodiments, when read in conjunction with the attached Drawing Figures, wherein.

DETAILED DESCRIPTION OF THE PREFERRED EMBODIMENTS

By way of introduction, a secure mobile file system (SMFS) in accordance with this invention provides a number of valuable features to discover and track the source of a file. A first feature enables one to determine the identities of persons who have modified the file in transit, and/or the persons who copied the file before redistributing the file to others. A second feature enables one to provide policies that prevent inappropriate file content, or restrict file sharing based on user preferences.

These and other features are provided by providing each user, such as each mobile user, with a public or a private key. Using the key each file is signed and resides in the user machine. The signed value is stored in the header of the file. The file header contains the file name, timestamp, size, public key (certificate), signed value and other related information. The SMFS extends the basic owner, group and others concept of normal file operation for the integrity check, and uses a normal trust relationship in a wireless environment to validate the file integrity as a self-defense mechanism. In one exemplary wireless embodiment of this invention, the SMFS also provides backward compatibility for the file so that the user can store and retrieve files from a mobile environment to a wired desktop environment.

The presently preferred SMFS embodiments use this information to validate and then to download only a validated file into the recipient system. In this manner the content of the file can be guaranteed to be valid, and if not the source of the file can be readily tracked, even through a plurality of successive prior file handlers.

This invention in one aspect thereof extends the basic file structure and adds security parameters such as public keys of the creator, signed values and file access control policies into the file header itself. In this manner the SMFS mechanism is totally independent of any specific operating system, and can be readily integrated into both wired and wireless (mobile) environments, and to combinations thereof.

In the SMFS when implemented in a wireless environment it may be assumed that each user is serviced by an operator, and there may be a federation of operators to support global roaming (as in GSM). In this case it may be the case that each operator acts as a Certificate Authority (CA) and issues a certificate to a user, which uniquely identifies the user.

Users can create, or download, or upload files in various ways. As non-limiting examples, a user can create a file via a text editor, or by performing compilation through a compiler, or by creating temporary files during some installation process, or by any suitable technique. The user may copy a file via File Transfer Protocol (FTP), or web download, or by other suitable means from an external host. The user may upload a file through FTP, or by other suitable means, to an external storage or external entity.

In order to indicate the origin of the file, and in accordance with an embodiment of this invention, each user signs the file with the user's public key. The signed value, along with public key, is stored as part of the file in the file header within the system. When the user is uploading the file the receipt system accepts the file download operation after performing key validation of the sender. When the sender begins to upload the file, the receiver examines the file header for the filename, extension, timestamp, public key of the original creator and a hash value. After receiving the file the receiver computes the hash and verifies the signature against the hash value in the header. If the signature is correct the receiver stores the file in the local system, otherwise it discards the received file. In this manner the user is enabled, via the user's receiver, to ensure that the file that was created by the original creator is intact, and was not modified or tampered with. If all user programs are downloaded to a system in this way then the desired security is achieved.

For example, assume that A is the original creator of the file, then B downloads the file from A, and then modifies the file and later forwards to C. Or user B simply distributes the file to C without making any modification to the file. In order to track these situations the preferred embodiments of this invention implement a chained authentication mechanism. That is, the files may be copied either by FTP or by some other process. In this case the invention creates a history (a file history) of entities who have copied or distributed the file, with their credentials, in the file header, using a chained process that is described in detail below. The file history is created in such a manner that it occupies only a few bytes in the file, and can be reproduced regardless of how many entities have handled the file by making copies of the file, forwarding or otherwise distributing the file. In this manner the entire history of a file can be determined, enabling one to track the path that the file has followed since its creation. Embodiments of this invention also support the use of software-based digital rights management (DRM) or other copyright protection schemes. It should be noted that no privacy issues that are raised, as the SMFS simply provides a trace-back path of the entities involved in the distribution of a file. The preferred embodiments of the SMFS are also hardware independent.

One exemplary operating system (OS) that can use the SMFS is known as UNIX™. In the UNIX™ operating system there are three levels of permission, namely Owner, Group and Others. The Owner can have read, write and execute permissions. The Owner can also specify the access rights for each file in order for Groups and Others to access the files. All of this information is contained in the file header and is stored in the file system. Reference can be had, for example, to "Cryptographic File System for Unix", Matt Blaze, 1993; Steve. D. Pate, "Unix File systems", Wiley Publications; and Marshall Kirk McKusick and others, "The design and implementation of 4.4 BSD operating system", Addison Wesley.

Figure 1:
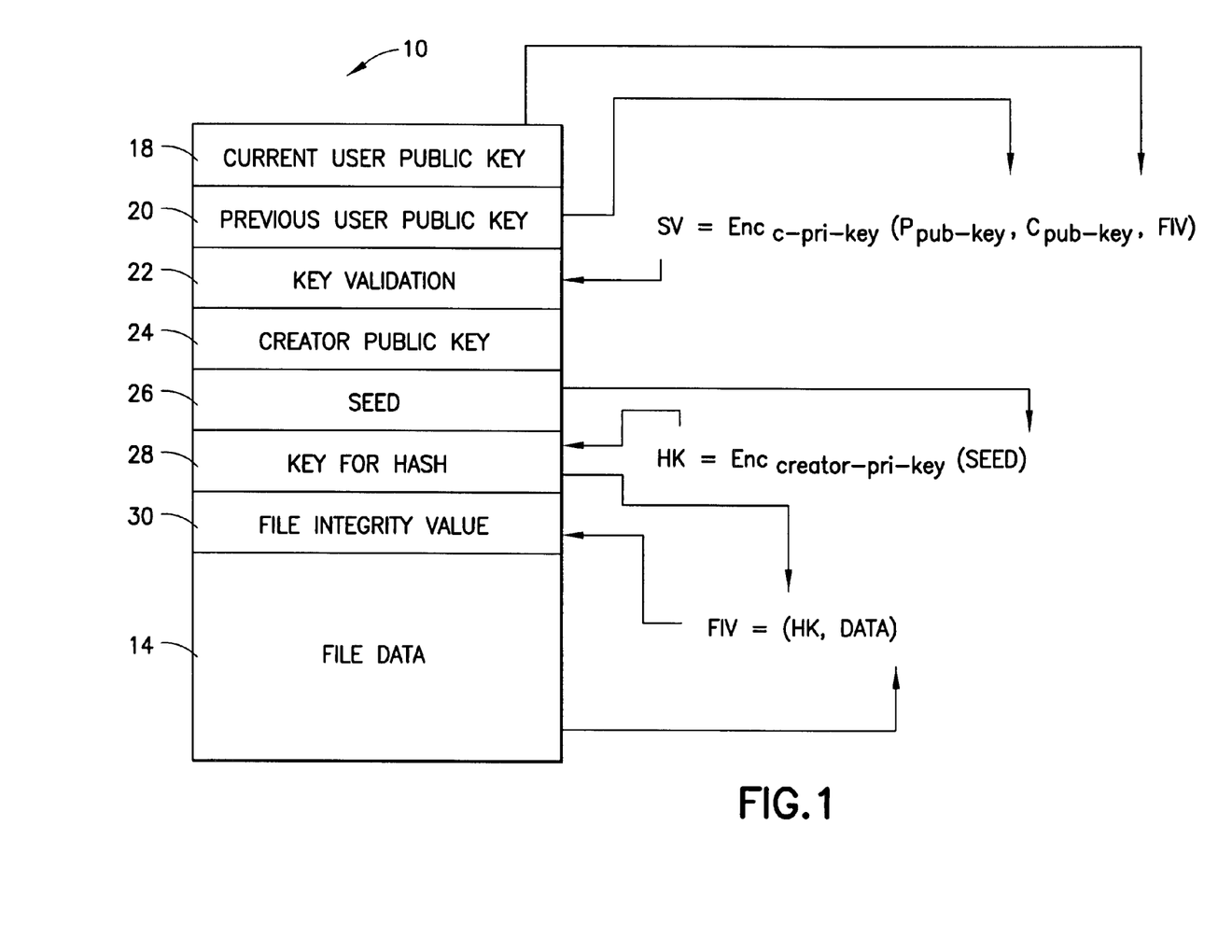
FIG. 1 shows a potion of file having an enhanced file header including fields for practicing the secure mobile file system (SMFS) aspects of this invention.

In the preferred SMFS embodiments additional fields are provided in a file data structure that is referred to for convenience as a file header 10, as shown in FIG. 1. A conventional File Name Extension field 12 and Data field 14 are shown, while other conventional fields are not shown for purposes of illustration. The additional or extension fields added in accordance with this invention can include all of, or a sub-set of, the following: a Current User Public Key field 18, a Previous User Public Key field 20, a Key Validation field 22, a Creator Public Key field 24, a Seed field 26, a Key for Hash field 28, and a File Integrity Value (FIV) field 30. Note these additional file fields can be effectively stored either at the end-of-the-file (EOF) or at the beginning-of-the-file (BOF) to achieve compatibility with existing file systems. For the purpose of illustration it is assumed that these additional fields are stored at the beginning of the file in the file header 10, as opposed to being stored in a file trailer at the end of the file. However, exactly where the data structure that contains at least the fields 18-30 is located in the file is not germane to an understanding of the operation of this invention, so long as the selected location is compatible with whatever operating system the SMFS is used with.

Figure 5:
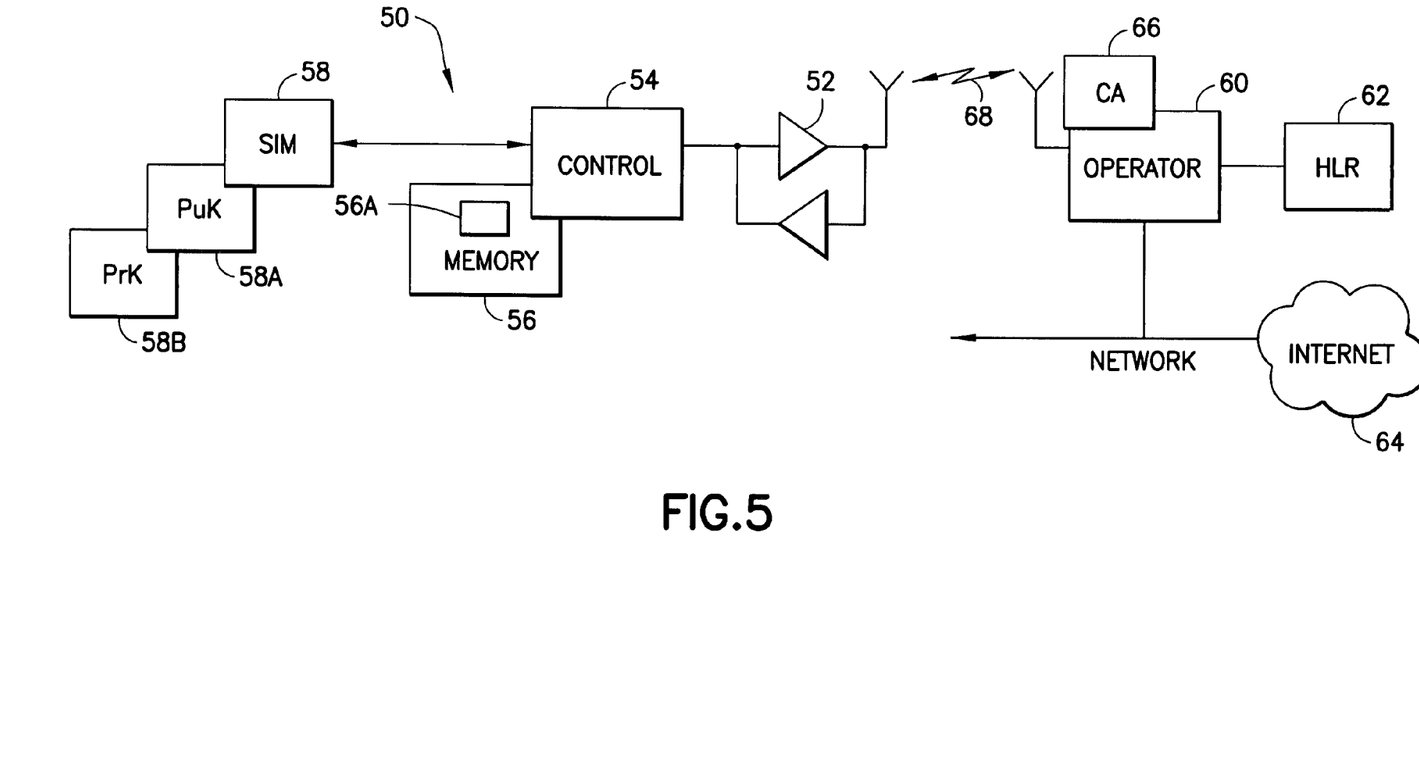
FIG. 5 is a simplified block diagram of one exemplary embodiment of a system having a mobile terminal and a network operator.

Before explaining the SMFS process in detail, and referring to FIG. 5, in one exemplary wireless embodiment it is assumed that a mobile terminal 50 is wireless coupled to a service provider or operator 60 via a wireless link 68 established through a transceiver 52. The wireless terminal 50 includes a controller 54, such as a microprocessor, and a memory 56. The wireless terminal may be a cellular telephone, or a portable Internet appliance, or a gaming device having wireless connectivity, or any desired type of cellular or non-cellular wireless communications/data processing device. For this example it is assumed that the mobile terminal 50 user has a Subscriber Identity Module (SIM) card 58 or some other authentication mechanism. For simplicity consider a SIM card enabled mobile telephone, as it provides device portability. Each user belonging to the service provider 60 has a certificate issued by the service provider 60, which implies that each user has a public (cryptographic) key (PuK) 58A and private (cryptographic) key (PrK) 58B, also referred to as a key pair. The service provider 60 preferably functions as, or has access to, a Certificate Authority (CA) 66, and may extend agreements through a Home Location Register (HLR) 62. The service provider 60 may use a GRX (GPRS Roaming Exchange) network for secured operation. The service provider 60 may be coupled to the Internet 64, and/or to a local area network (LAN). The wireless link 68, while assumed in this example to be a cellular link, could be a wireless LAN (WLAN) link in other embodiments. For the purposes of this invention the memory 56 is assumed to store a program 56A for enabling the controller 54 to implement the mobile terminal 50 aspects of this invention. In general, the program 56A is assumed to implement, at least in part, the functionality of the Secure Mobile File System (SMFS) in accordance with aspects of this invention. Similar functionality is assumed to be resident in the service provider 60, and in any network node or nodes that operate in accordance with the embodiments of this invention.

Note that in other embodiments of this invention the terminal 50 may not be a mobile terminal, but may instead be a (relatively) fixed terminal such as a PC or a workstation or a laptop computer having wired or wireless network connectivity through which files can be received and/or transmitted. In this case the file system may not be characterized as being a mobile file system.

Presently preferred embodiments of the SMFS is now further described in light of FIGS. 2, 3A, 3B and 4, in addition to FIGS. 1 and 5 referred to above.

Creating a File:

A. For example, assume a Server "A" has created a file in a file server, such as a multimedia file. The creator of the file is referred to as the owner, and the owner creates and stores the file in a disk with credentials. In FIG. 1, the creator first derives a (preferably) random number called the Seed (which could be derived from a free running clock or by some other means), and encrypts the Seed using the owner's private key. The creator then stores his public key in field 24, the random Seed in field 26, and the encrypted random seed value as the Hash Key (HK) in the field 28.

B. Next, the file integrity checksum is computed. In this step, HMAC is computed using the Hash Key (which was computed in previous step and stored in the field 28) along with the file data 14 (the actual file contents), and the result is stored in the File Integrity Value field 30 in the file header. Or one can perform the digest on the existing data and the resultant value of the digest can be hashed, using the creator's public key in field 24, and the value then stored in field 30 as the file integrity value (FIV). If this method is employed then the seed value field 26 can be initialized with a well-known value.

It should be noted that the above two procedures are themselves sufficient to combat email viruses and other attacks. If two users in the mobile environment exchange a file, the file system in the receiving terminal performs automatically the validity and integrity check of the file content. If the certificate authority 66 is different, then the terminal 50 queries the operator 60 server that acts as the certificate authority 66, and receives the actual certificate in order to verify the content.

This mechanism prevents the user from executing malicious files, as the attacker needs to know the key. In general, it is very difficult to forge or create a file that matches the integrity value of file created by a valid user.

By default, the (mobile) file system bars from entry any file that does not have the file integrity fields in the file header 10. The additional fields can be provided as needed to distinguish the file system type, file state, etc. This makes it straightforward for an enterprise to manage the users even when the users are remotely located.

Tracing the Path:

The following additional mechanisms enable the system to detect and track software piracy and to provide higher trust and protection. The following procedures can be used if desired as a diagnostic tool, and need not be performed during each file handling operation on the mobile terminal 50.

The concept is based on layered encryption and decryption using public key cryptography. For example, assume owner "A" creates a file with the integrity check fields completed, and then passes the file to another user "B" who copies the file into the local file system, and then passes the file to user "C", and so on. During this process, assume that user "P" receives a file and desires to learn all of the users involved in the copying process, back to the original owner.

This can be accomplished, in accordance with an aspect of this invention, by the use of only three additional fields in the file header 10, i.e., the Current User Public Key field 18, the Previous User Public Key field 20 and the Key Validation field 22.

Assume for example that the owner first creates the file, then the value of the Current User Public Key field 18 is the same as the value of the Previous User Public Key field 20. The Key Validation field 22 value is computed using the current user's private key value (c-pri-key), along with the value of the Current User Public Key field 18, the value of the Previous User Public Key field 20, and File Integrity value and the result (Security Validation or SV) is stored in the Key Validation field 22.

Figure 2A:
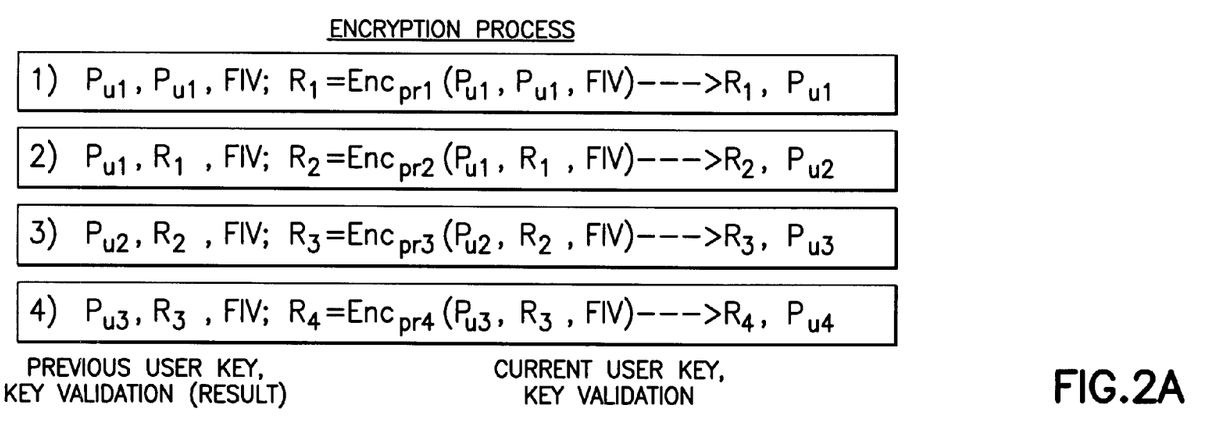
FIGS. 2A and 2B, collectively referred to as FIG. 2, show a SMFS encryption process and a SMFS decryption process, respectively.
Figure 2B:
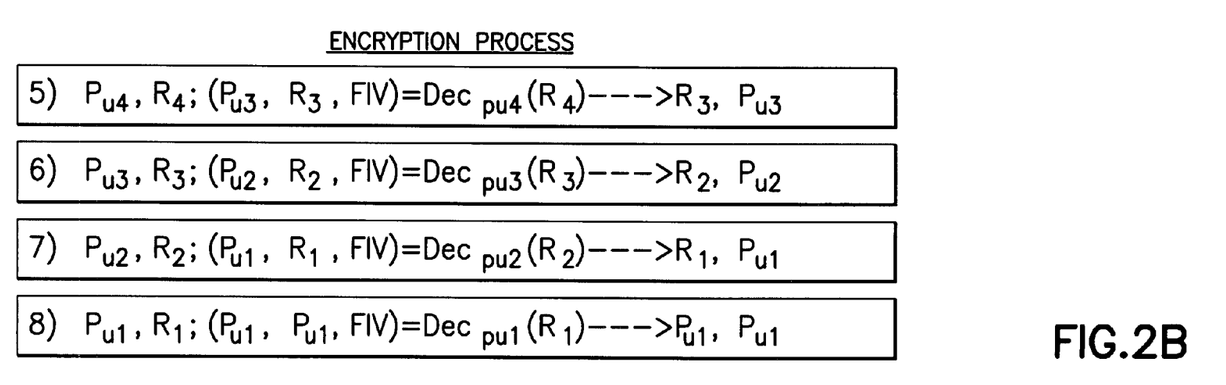

An exemplary encryption and decryption process for four users is shown in FIGS. 2A and 2B, respectively, and employs the following sequence of operations numbered as 1-8 for convenience.

1. User-1 creates a file. The public key of User-1 is Pu1. The Current User Public Key and Previous User Public Key is also Pu1 and is stored in the file header 10 in fields 18 and 20, respectively. The creator MFS (mobile file system) encrypts these two keys, along with the file integrity value (FIV) stored in field 30, with the creator's private key and stores the result R1 in the file header 10 in the Key Validation field 22.

2. Assume that User-2 requests the file from User-1. User-2 extracts the previous user's public key (Pu1), the current user's public key (Pu1), and the encrypted result (R1) from the file header 10. User-2 performs a file copy operation on the disk of User-2, then User-2 becomes the current user and copies the value from the Current User Public Key field 18 (Pu1) from the file header 10 to Previous User Public Key field 20. User-2 then inserts his or her public key as the value of the Current User Public Key field 18 in the file header 10. User-2 then performs the encryption of his public key (Pu2) and the Previous User Public Key (Pu1) using his private key along with the FIV value from field 30, and stores the result R2 in the Key Validation field 22 in the file header 10.

3. Assume that User-3 requests the file from User-2. User-3 extracts the previous user's public key (Pu1), the current user's public key (Pu2), and the encrypted result (R2) from the file header 10. User-3 performs a file copy operation and then User-3 becomes the current user and copies the value from the Current User Public Key field 18 (Pu2) from the file header 10 to Previous User Public Key field 20. User-3 then inserts his or her public key as the value of the Current User Public Key field 18 in the file header 10. User-3 then performs the encryption of his public key (Pu3) and the Previous User Public Key (Pu2) using his private key along with FIV, and stores the result R3 in the Key Validation field 22 in the file header 10.

4. Assume now that User-4 requests the file from User-3. User-4 extracts the previous user's public key (Pu2), the current user's public key (Pu3), and the encrypted result (R3) from the file header 10. User-4 performs a file copy operation and then User-4 becomes the current user and copies the value from the Current User Public Key field 18 (Pu3) from the file header 10 to Previous User Public Key field 20. User-4 then inserts his or her public key as the value of the Current User Public Key field 18 in the file header 10. User-4 then performs the encryption of his public key (Pu4) and the Previous User Public Key (Pu3) using his private key along with the FIV, and stores the result R4 in the Key Validation field 22 in the file header 10.

This process is repeated for by mobile file system for each copy operation. The appropriate file system hooks are provided during open, write and close system calls and the mobile file system ensures that in a received file that the public key is current and is present in the file header 10. The potential presence of loops is not a concern, as the mobile file system simply performs copying operations, and the file integrity (field 30) is computed as described above.

The decryption process shown in FIG. 2B is effectively the reverse of the encryption process shown in FIG. 2A, and enables a trace-back operation to occur in order to determine all parties involved in copying the file. Assume that the file is residing in the terminal 50 of User-4, and a decision is made to trace-back through the users involved in copying the file. The file header fields contain the previous user's current public key=Pu4, the previous user's key=Pu3, and the encrypted result is R4 stored in the Key Validation field 22.

5. User-4, using his public key (Pu4) decrypts R4 which produces Pu3 and R3 and the FIV. This shows that R3 was produced using User-3 keys.

6. User-4 then repeats the process and decrypts R3 using the just-obtained User-3 public key (Pu3), and the result of the decryption yields R2, Pu2 and FIV.

7. User-4 then repeats the process and decrypts R2 using the User-2 public key (Pu2). This time the result of the decryption yields R1, Pu1 and FIV.

8. Then User-4 repeats the process and decrypts R1 using the User-1 public key (Pu1). This time the result of the decryption yields R1 and Pu1. Since the Pu1 is produced in previous step as well as in this step, Pu1 is the creator of the file.

This relatively simple mechanism can be useful in many environments. For example, this aspect of the invention can be used to traverse a file copy path for digital rights management (DRM), to restrict software piracy and unauthorized distribution of software files, and, by deploying some form of relay and scanner at the edge of the operator 60, to snoop FTP traffic between two mobile (or other) users.

To support file transfer and management operations in accordance with embodiments of this invention a gateway module may be integrated into the file system with a mobile terminal (MT)-FTP utility. This utility can resides in the user-space, and may perform cryptographic operations such as creating a digital signature using the creator's private key, updating the file extension header 10 with the creator public key, resetting an optional File State in the file header 10 and finally uploading the file. As an example, the operator 60 may host a music download service and, in this case, the operator 60 creates the file and places it on a web server. The mobile terminal 50 may then employ a SMFS-FTP utility to performs the file download operation.

An exemplary logical design can be described with reference to FreeBSD (see Marshall Kirk McKusick and others, "The Design and implementation of 4.4 BSD Operating System", Addison Wesley. The invention can also be employed in mobile terminal operating systems such as one known as the Symbian OS™.

It should be appreciated that the SMFS in accordance with the preferred embodiments of this invention is not limited for use with any specific operating system or file system format. For example, in addition to the UNIX™ and the Symbian OS™ operating systems, the secure file system made possible by the preferred embodiments of this invention can be used with, as non-limiting examples, WINDOWS™ operating systems and derivatives thereof, as well as with open source operating systems such as one known as LINUX™. Those skilled in the art should recognize how to port the secure file system described above to a selected operating system, based on the preferred additions to the file header shown in FIG. 1 and in view of the following discussion of FIGS. 3 and 4.

Figure 3:
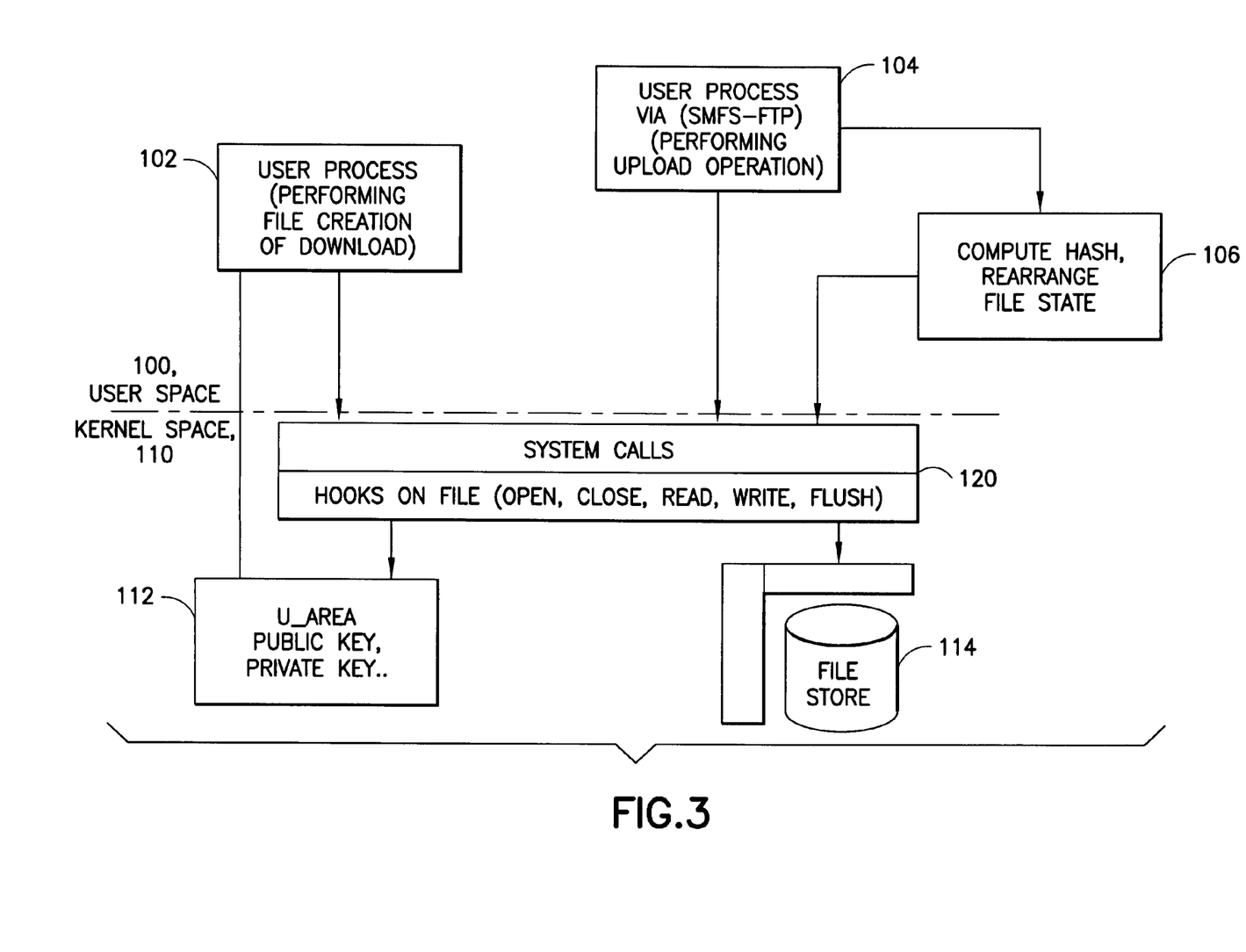
FIG. 3 is a block diagram of one exemplary embodiment of a logical architecture of various SMFS entities.

Referring to FIG. 3, files can be created in the user system or space 100 (as opposed to process or kernel space 110) when, as examples, the user creates the file with a text editor or by compilation, or by copying from an external host via ftp, or by a file download, or by an email attachment, shown generally as the block 102. The user space 100 and kernel space 110 communicate via system calls and various file system hooks, shown generally as the block 120. The implementation details of the various calls and hooks are dependent on the specifics of the target OS. The kernel space is assumed to include the file store, shown as a file store disk 114. Other file storage devices, such as non-volatile semiconductor memory, may be employed as well.

Each user preferably is assigned a public key and a private key pair that is stored as part of the user profile in the system. When the user is logged in, and executes any application, the user's public key and private key are copied on to a data structure referred to as the u_area data structure 112 of the process or kernel space 110. When the user copies the file, the user performs open, read, write and close operations on the file system. These are standard system calls (block 120). When user performs any such operations the system call is modified in such a way that it tracks the user and modifies the appropriate state in the file header 10. At least for performance reasons it is preferred that no cryptographic operations take place within the kernel context or space 110. Instead the kernel space 110 creates a file with the additional extension headers (at least the fields 18 through 30 in FIG. 1), copies the user keys from the u_area 112 to the file header 10, and updates the file state as needed.

FIG. 3 shows the module 120 that resides in the kernel space 110 and traps all the system calls for file operations (such as file open, close, dup, write, close, flush etc). The SMFS-FTP module 104 is a user space 100 utility, and is an extended FTP mainly used to securely upload files. At least one purpose of the SMFS-FTP module 104 is to perform cryptographic operations, such as computing a digital signature (hash) on the entire file and updating the file states (shown as block 106), as well as performing conventional FTP operations. SMFS-FTP on the receiving machine performs verification of the hash, and then creates and fills the appropriate values in the file header 10.

Figure 4:
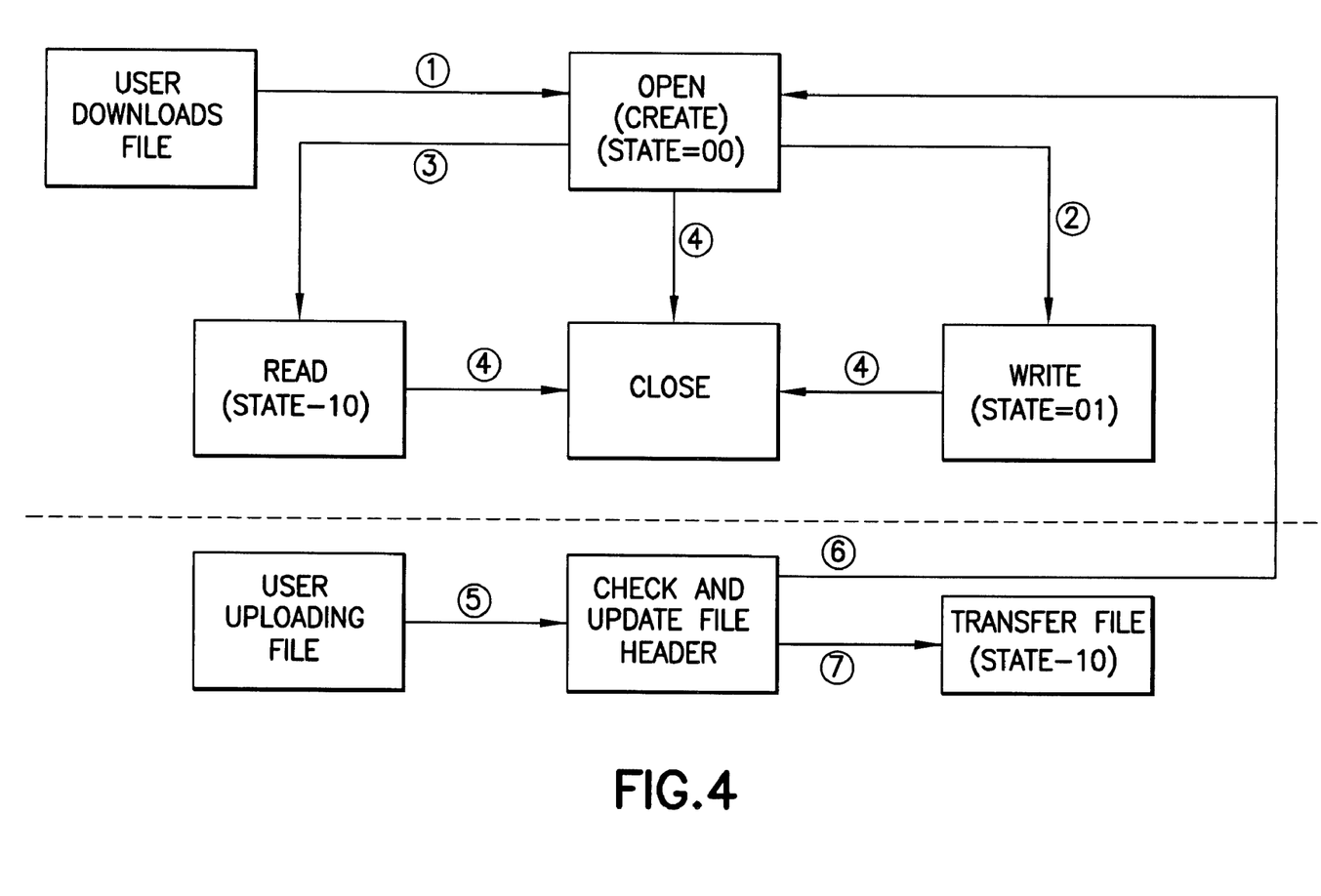
FIG. 4 is a state machine representation of one exemplary embodiment of files in the SMFS.

FIG. 4 shows a non-limiting example of a state machine representation of files in the SMFS. The file state (FS) describes the status of the file. When the user creates a file for the first time, described in FIG. 4 as state transition 1, the SMFS stores the value "00" as the File State. This implies that the file is created, the owner's key is copied, and hash value is set to NULL. Later, if the user performs a write operation, for the first write operation the SMFS updates the content of the File State to "01", shown in FIG. 4 as state transition 2. This indicates that the file is written by the owner, and that no hash value is recomputed based on the written content. For subsequent a write operation no changes are made to the file headers.

The user may close the file just after opening the file, or after performing one or more write operations, shown in FIG. 4 as state transition 4. The user after opening the file can also perform a read operation, and if the user performs the read operation the File State value is updated to "01", as shown in FIG. 4 as state transition 3. Refer to Table 1 for a summary of these exemplary file states.

TABLE 1

| Value | State |
|-------|-------|
| 00 | File is clean |
| 01 | File is opened and read, but not modified |
| 10 | File is written, but no HASH is computed |

For example, if the file is closed and the state of the file is "10", and at a later time the file is opened for reading only by the same or by a different user, the file state is not updated. Later, when the user decides to upload the file through SMFS-FTP, via state transition 5 the file state is checked first, and if it equal to "00", then the file is simply uploaded to the recipient, shown as state transition 6. If the file state is equal to "10", them SMFS-FTP computes the hash over the file using creator's public key (extracted from file header) and then copies the hash in the file header and also changes the state to "00". The file is then uploaded to the recipient machine via state transition 7.

This invention can find utility in any number of existing file systems, such as Cryptographic File Systems (CFS) and Andrew File Systems (AFS). By providing hooks to legacy file system interfaces and calls, as was discussed above, this invention may be readily implemented and integrated into pre-existing legacy file systems. As was noted above, based on the description herein those skilled in the art should recognize how to integrate the SMFS into a target OS of interest.

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. As but some examples, the use of other similar or equivalent cryptographic techniques may be attempted by those skilled in the art. Further, while this invention preferably employs Message Authentication Code (MAC) processes, and may be best suited in some applications for execution by hardware, in other applications an all software implementation may be preferred, or a hardware-assisted software solution may be preferred. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method comprising:
    in response to a file creator creating a file, obtaining a seed value;
    encrypting the seed value using a private cryptographic key associated with the file creator to form an encrypted seed value;
    storing as part of the file a public cryptographic key associated with the file creator, the seed value and the encrypted seed value;
    computing a file integrity value using the encrypted seed value and file data; and
    storing as part of the file the computed file integrity value.

2. A method as in claim 1, where the method is executed within a terminal.

3. A method as in claim 1, where the method is executed within a mobile wireless terminal that operates with a wireless operator, and where the private cryptographic key and the public cryptographic key comprise a key pair assigned by a certificate authority associated with the wireless operator.

4. A method as in claim 1, where the method is executed by a network node.

5. A method as in claim 4, where the network node is coupled to a wireless operator that operates with a mobile wireless terminal.

6. A method as in claim 1, further comprising:
    storing as part of the file the public cryptographic key associated with the file creator as a value of a current user public key and as a value of a previous user public key;
    encrypting the values of the current user public key and the previous user public key using the private cryptographic key associated with the file creator to form an encrypted result; and
    storing as part of the file the encrypted result as an encrypted key validation value.

7. A method as in claim 6, where the file creator is considered as User-1, further comprising, in response to another user (User-2) gaining access to the file:
    extracting from the file the stored values of the previous user public key, the current user public key, and file integrity value and encrypted result;
    in response to User-2 becomes a current user of the file, copying the value from the current user public key to the value of the previous user public key;
    inserting the value of the public cryptographic key associated with User-2 as the value of the current user public key;
    encrypting the values of the current user public key and the previous user public key using a private cryptographic key associated with User-2 and file integrity value to form a second encrypted result; and
    storing as part of the file the second encrypted result as the encrypted key validation value.

8. A method as in claim 7, further comprising:
    decrypting the second encrypted result using the value of the public cryptographic key of User-2 to yield the value of the public cryptographic key of User-1; and
    associating User-1 with the file creator.

9. A method as in claim 1, where storing as part of the file stores in fields that form a part of a file header.

10. A method as in claim 7, where storing as part of the file stores in predetermined fields that form a part of the file, further comprising accepting the file as a valid file at User-2 only if the predetermined fields are present in the file.

11. A system comprising a file creator configured to create a file, the file creator comprising a unit to obtain a seed value and encrypt the seed value using a private cryptographic key associated with the file creator to form an encrypted seed value;
    the file creator unit further configured:
        to store as part of the file a public cryptographic key associated with the file creator, the seed value and the encrypted seed value,
        to compute a file integrity value using the encrypted seed value and file data and
        to store as part of the file the computed file integrity value.

12. A system as in claim 11, where the file creator is associated with a terminal.

13. A system as in claim 11, where the file creator is associated with a mobile wireless terminal that operates with a wireless operator, and where the private cryptographic key and the public cryptographic key comprise a key pair assigned by a certificate authority associated with the wireless operator.

14. A system as in claim 11, where the file creator is associated with a network node.

15. A system as in claim 14, where the network node is coupled to a wireless operator that operates with a mobile wireless terminal.

16. A system as in claim 11, where the unit is further configured to store as part of the file the public cryptographic key associated with the file creator as a value of a current user public key and as a value of a previous user public key; to encrypt the values of the current user public key and the previous user public key using the private cryptographic key associated with the file creator to form an encrypted result; and to store as part of the file the encrypted result as an encrypted key validation value.

17. A system as in claim 16, where the file creator is considered as User-1, further comprising, in response to another user (User-2) gaining access to the file, a unit to extract from the file the stored values of the previous user public key, the current user public key and the encrypted result; and responsive to User-2 becoming a current user of the file, to copy the value from the current user public key to the value of the previous user public key; to insert the value of the public cryptographic key associated with User-2 as the value of the current user public key; to encrypt the values of the current user public key and the previous user public key using a private cryptographic key associated with User-2 to form a second encrypted result; and to store as part of the file the second encrypted result as the encrypted key validation value.

18. A system as in claim 17, further comprising a unit to decrypt the second encrypted result using the value of the public cryptographic key of User-2 to yield the value of the public cryptographic key of User-1; and to associate User-1 with the file creator.

19. A system as in claim 11, where the unit stores in fields that form a part of a file header.

20. A system as in claim 17, where the unit that stores in predetermined fields that form a part of the file, and where the file is accepted as a valid file at User-2 only if the predetermined fields are present in the file.

21. A file having a representation that is storable in a digital data storage medium, the file comprising a file data portion for storing file data and a data structure comprising fields for storing values, at least one of said fields storing a name of the file, and a plurality of others of said fields storing a value of a public cryptographic key associated with a file creator, a seed value, an encrypted seed value obtained by encrypting the seed value with a private cryptographic key of the file creator, and a file integrity value obtained using the encrypted seed value and the file data.

22. A file as in claim 21, said plurality of others of said fields further storing a current user public key value, a previous user public key value, and an encrypted result value obtained by encrypting the current user public key value and the previous user public key value using the private cryptographic key associated with the current user.

23. A file as in claim 21, said plurality of others of said fields further storing a value of a file state indicating at least whether the file is in an open state, a read state or a write state.

24. A file as in claim 22, where encrypted values are obtained by a secure mobile file system file transfer protocol unit that operates in a user space and outside of a kernel space.

25. A digital data storage medium that stores a file comprised of a file data portion for containing file data and a data structure comprising fields for containing values, a plurality of said fields containing a value of a public cryptographic key associated with a file creator, a seed value, an encrypted seed value obtained by encrypting the seed value with a private cryptographic key of the file creator, and a file integrity value obtained using the encrypted seed value and the file data.

26. A digital data storage medium as in claim 25, said plurality of fields further containing a current user public key value, a previous user public key value, and an encrypted result value obtained by encrypting the current user public key value and the previous user public key value using the private cryptographic key associated with the current user.

27. A digital data storage medium as in claim 25, said plurality of fields further containing a value of a file state indicating at least whether the file is in an open state, a read state or a write state.

28. A digital data storage medium as in claim 25, where said digital data storage medium comprises a part of a terminal coupled to a digital data communications network.

29. A digital data storage medium as in claim 25, where said digital data storage medium comprises a part of a mobile wireless terminal that comprises a transceiver for coupling the terminal to a wireless network operator.

30. A digital data storage medium as in claim 25, where said digital data storage medium is coupled with a mobile wireless terminal that comprises a transceiver for coupling the terminal to a wireless network operator.

31. An apparatus comprising:
a controller; and
a memory,
said memory configured to store a file system program executable by said controller and to store a file comprising a file data portion for containing file data and a data structure comprising a plurality of fields for containing values,
where the plurality of fields comprise:
a value of a public cryptographic key associated with a creator of the file,
a seed value,
an encrypted seed value obtained by encrypting the seed value with a private cryptographic key of the creator of the file, and
a file integrity value obtained using the encrypted seed value and the file data.

32. An apparatus as in claim 31, said plurality of fields further containing a current user public key value, a previous user public key value, and an encrypted result value obtained by encrypting the current user public key value and the previous user public key value using the private cryptographic key associated with the current user.

33. An apparatus as in claim 31, said plurality of fields further containing a value of a file state determined by said file system program to be one of the file is in an open state, a read state or a write state.

34. An apparatus as in claim 31, where the public cryptographic key and the private cryptographic key are stored in said memory, and are received from a certificate authority.

35. An apparatus as in claim 31, embodied as a mobile terminal.

36. An apparatus as in claim 31, where the apparatus is embodied in an integrated circuit.

* * * * *